United States Patent
Haynes et al.

(10) Patent No.: US 7,908,864 B2
(45) Date of Patent: Mar. 22, 2011

(54) COMBUSTOR NOZZLE FOR A FUEL-FLEXIBLE COMBUSTION SYSTEM

(75) Inventors: Joel Meier Haynes, Niskayuna, NY (US); David Matthew Mosbacher, Cohoes, NY (US); Jonathan Sebastian Janssen, Troy, NY (US); Venkatraman Ananthakrishnan Iyer, Mason, OH (US)

(73) Assignee: General Electric Company, Niskayuna, NY (US)

( * ) Notice: Subject to any disclaimer, the term of this patent is extended or adjusted under 35 U.S.C. 154(b) by 1171 days.

(21) Appl. No.: 11/539,195

(22) Filed: Oct. 6, 2006

(65) Prior Publication Data
US 2008/0083229 A1    Apr. 10, 2008

(51) Int. Cl.
F02C 1/00    (2006.01)
(52) U.S. Cl. .................. 60/748; 60/742; 60/39.463
(58) Field of Classification Search ............... 60/734, 60/737, 739, 740, 742, 748, 780, 746, 39.463
See application file for complete search history.

(56) References Cited

U.S. PATENT DOCUMENTS

| | | | | |
|---|---|---|---|---|
| 5,675,971 A * | 10/1997 | Angel et al. | ............ | 60/746 |
| 5,901,547 A * | 5/1999 | Smith et al. | ............ | 60/773 |
| 6,082,092 A * | 7/2000 | Vandervort | ............ | 60/773 |
| 6,201,029 B1 * | 3/2001 | Waycuilis | ............ | 518/703 |
| 6,438,961 B2 | 8/2002 | Tuthill et al. | | |
| 6,786,047 B2 | 9/2004 | Bland et al. | | |
| 2002/0144508 A1 * | 10/2002 | Arar et al. | ............ | 60/781 |
| 2003/0150216 A1 * | 8/2003 | O'Beck et al. | ............ | 60/775 |
| 2004/0006993 A1 * | 1/2004 | Stuttaford et al. | ............ | 60/776 |
| 2004/0013987 A1 * | 1/2004 | O'Rear et al. | ............ | 431/2 |
| 2006/0236700 A1 * | 10/2006 | Saitoh et al. | ............ | 60/737 |
| 2006/0248872 A1 * | 11/2006 | Bachovchin et al. | ............ | 60/39.12 |
| 2007/0180815 A1 * | 8/2007 | Tangirala et al. | ............ | 60/247 |
| 2007/0234735 A1 * | 10/2007 | Mosbacher et al. | ............ | 60/780 |

OTHER PUBLICATIONS

The University of Queensland; Division of Mechanical Engineering MECH4480, Computational Fluid Dynamics; "Major Project: Fluent Simulation of Turbulent Flow in a Coaxial Jet Combustor".
A. James Clark; University of Maryland; The Combustion Laboratory; "Non-premixed Co-Annular Swirl Burner".
A. James Clark; University of Maryland; The Combustion Laboratory; "Premixed Co-Annular Swirl Burner".
A. L. Shihadeh, M.A. Toqan, J.M. Beer, P.F. Lewis, J.D. Teare, J.L. Jimenez, and L. Barta; "Low NOx Emission From Aerodynamically Staged Oil-Air Turbulent Diffusion Flames; ASME Fact-18", Combustion Modeling, Scaling and Air Toxins, 1994; (6 Pages).

* cited by examiner

*Primary Examiner* — Michael Cuff
*Assistant Examiner* — Phutthiwat Wongwian
(74) *Attorney, Agent, or Firm* — Ann M. Agosti

(57) ABSTRACT

A combustor nozzle is provided. The combustor nozzle includes a first fuel system configured to introduce a syngas fuel into a combustion chamber to enable lean premixed combustion within the combustion chamber and a second fuel system configured to introduce the syngas fuel, or a hydrocarbon fuel, or diluents, or combinations thereof into the combustion chamber to enable diffusion combustion within the combustion chamber.

22 Claims, 8 Drawing Sheets

US 7,908,864 B2

COMBUSTOR NOZZLE FOR A FUEL-FLEXIBLE COMBUSTION SYSTEM

STATEMENT REGARDING FEDERALLY SPONSORED RESEARCH & DEVELOPMENT

This invention was made with Government support under contract number DE-FC26-03NT41776 awarded by the U.S. Department of Energy. The Government has certain rights in the invention.

BACKGROUND

The invention relates generally to a combustion system, and more particularly, to a fuel-flexible combustion system and method of operation.

Various types of combustors are known and are in use in systems such as in combined cycle power plants. Typically, the combustors for such systems are designed to minimize emissions such as $NO_x$ and carbon monoxide emissions. In most natural gas fired systems, the combustors are operated using lean premixed flames. In these systems fuel is mixed with air upstream of the reaction zone for creating a premixed flame at lean conditions to reduce emissions from the combustion system. Unfortunately, the window of operability is very small for such combustion systems. Further, it is desirable to avoid combustion dynamics while keeping NOx low and avoiding lean blow out of the flame. Designs are typically targeted for a narrow fuel composition range, thereby making a system designed for natural gas incompatible with a system designed to use gasified coal or synthesis gas fuel.

Certain other systems employ diffusion combustion to minimize emissions through diluent augmentation in the reaction zone. For example, in an integrated coal gasification combined cycle (IGCC) system, steam or nitrogen may be employed as a diluent to facilitate the combustion and reduce emissions from the combustor. Typically, for an IGCC system, the combustor is designed to operate in a diffusion mode using a coal gasified fuel and may have a backup firing mode using natural gas in a diffusion mode. However, it is challenging to design a combustor that can operate on coal gasified fuels having varying calorific heating values while maintaining low emissions. The current IGCC combustors employ diffusion combustion and are designed on a site-by-site basis according to the gasified fuel stock. This results in specific combustion systems that have limited fuel flexibility in order to meet emission requirements.

Accordingly, there is a need for a combustion system that will work on a variety of fuels while maintaining reduced emissions. It would also be advantageous to provide a combustion system that has sustained low emission firing with a backup fuel and is adaptable to different power plant configurations while maintaining the overall power plant efficiency.

BRIEF DESCRIPTION

Briefly, according to one embodiment a combustor nozzle is provided. The combustor nozzle includes a first fuel system configured to introduce a syngas fuel into a combustion chamber to enable lean premixed combustion within the combustion chamber and a second fuel system configured to introduce the syngas fuel, or a hydrocarbon fuel, or diluents, or combinations thereof into the combustion chamber to enable diffusion combustion within the combustion chamber.

In another embodiment, a fuel-flexible combustion system is provided. The fuel-flexible combustion system includes a combustor nozzle configured to introduce a fuel stream within the combustion system and a combustion chamber configured to combust the fuel stream and air through a combustion mode selected based upon a fuel type of the fuel stream. The combustor nozzle includes a first fuel system configured to introduce a hydrocarbon fuel, or a syngas fuel, or combinations thereof into the combustion chamber to enable a premixed combustion mode within the combustion chamber and a second fuel system configured to introduce the syngas fuel, or nitrogen, steam, or hydrocarbon fuel, or combinations thereof into the combustion chamber to enable a diffusion combustion mode within the combustion chamber.

In another embodiment, an integrated coal gasification combined cycle (IGCC) system is provided. The IGCC system includes a gasifier configured to produce a syngas fuel from coal and a gas turbine configured to receive the syngas fuel from the gasifier and to combust the syngas fuel and air within a combustion system to produce electrical energy. The combustion system includes a combustion nozzle having first and second fuel systems for introducing syngas within the nozzle for premixed and diffusion modes of operation and a combustion chamber configured to combust the syngas fuel and air through premixed or diffusion modes of combustion.

In another embodiment, a method of operating a fuel-flexible combustion system is provided. The method includes introducing a fuel stream within the combustion system via a combustor nozzle and combusting a hydrocarbon fuel stream in a low emission combustion mode and combusting a syngas fuel in a second combustion mode. The method also includes switching the second combustion mode based on the calorific heating value of the syngas and combusting the fuel stream and air through the low emission combustion mode, or the second combustion mode, or combinations thereof.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
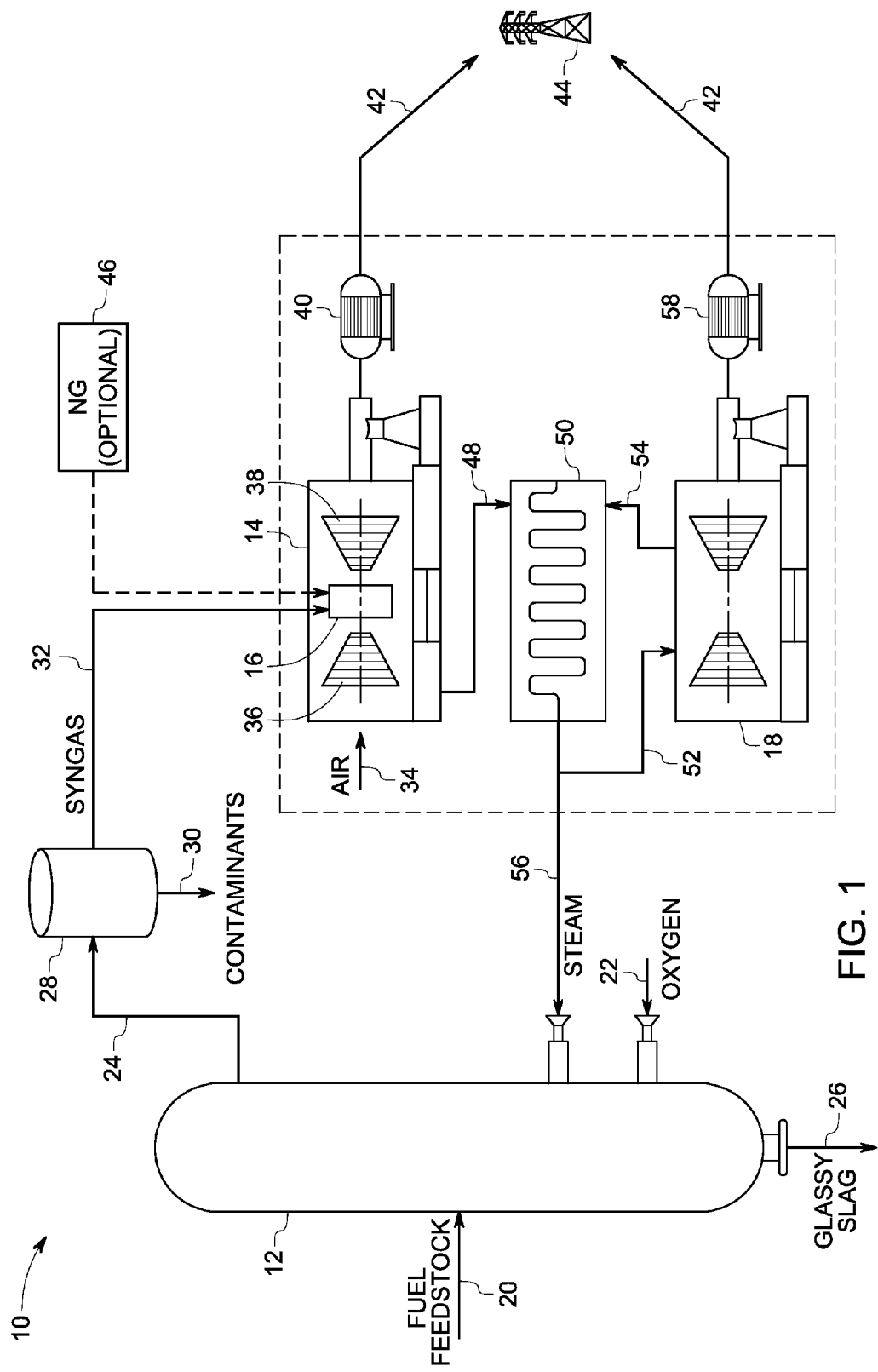
FIG. 1 is a diagrammatical illustration of an integrated coal gasification combined cycle (IGCC) system having a fuel-flexible combustion system in accordance with aspects of the present technique.

As discussed in detail below, embodiments of the present technique function to provide a fuel-flexible combustion system that will work with a variety of fuels while having reduced emissions. In particular, the present technique employs a combustor nozzle that operates with, for example, natural gas and a wide range of syngas fuels by switching between lean premixed and diffusion combustion modes based upon a desired or required volumetric flow rate of the fuel feedstock. Turning now to the drawings and referring first to FIG. 1, an integrated coal gasification combined cycle (IGCC) system 10 is illustrated. The IGCC system 10 includes a gasifier 12 and a gas turbine 14 coupled to the gasifier 12. Further, the gas turbine 14 includes a fuel-flexible combustion system 16 configured to combust a fuel stream from the gasifier 12 to produce electrical energy. In addition, the IGCC system 10 includes a steam turbine 18 coupled to the gas turbine 14 and configured to generate electrical energy by utilizing heat from exhaust gases from the gas turbine 14.

In operation, the gasifier 12 receives a fuel feedstock 20 along with oxygen 22 that is typically produced in an on-site air separation unit (not shown). In the illustrated embodiment, the fuel feedstock 20 includes coal. In other embodiments, the fuel feedstock 20 can include any Low Value Fuel (LVT) for example, coal, biomass, waste, oil sands, municipal waste, coke and the like. The fuel feedstock 20 and oxygen 22 are reacted in the gasifier 12 to produce synthesis gas (syngas) 24 that is enriched with carbon monoxide (CO) and hydrogen ($H_2$). Further, feedstock minerals are converted into a slag product 26 that may be utilized in roadbeds, landfill cover and other applications.

The syngas 24 generated by the gasifier 12 is directed to a gas cooling and cleaning unit 28 where the syngas 24 is cooled and contaminants 30 are removed to generate purified syngas 32. In the illustrated embodiment, the contaminants 30 include, for example, sulfur, mercury, or carbon dioxide. Further, the purified syngas 32 is combusted in the gas turbine 14 to produce electrical energy. In this exemplary embodiment, an incoming flow of air 34 is compressed via a compressor 36 and the compressed air is directed to the combustion system 16 for combusting the syngas 32 from the gasifier 12. Further, the combustor gas stream from the combustion system 16 is expanded through a turbine 38 to drive a generator 40 for generating electrical energy 42 that may be directed to a power grid 44 for further use. In certain embodiments, the fuel-flexible combustion system 16 utilizes natural gas 46 for a lean premixed combustion, typically as a backup mode of operation.

In the illustrated embodiment, exhaust gases 48 from the gas turbine 14 are directed to a heat recovery steam generator 50 and are utilized to boil water to create steam 52 for the steam turbine 18. Further, in certain embodiments, heat 54 from the steam turbine may be coupled to the heat recovery steam generator 50 for enhancing efficiency of the heat recovery steam generator 50. In addition, a portion of steam 56 from the heat recovery steam generator 50 may be introduced into the gasifier 12 to control the $H_2$:CO ratio of the generated syngas 24 from the gasifier 12. The steam turbine 18 drives a generator 58 for generating electrical energy 42 that is again directed to the power grid 44 for further use.

The fuel-flexible combustion system 16 employed in the IGCC system 10 described above may be operated in a lean premixed or a diffusion combustion mode. In particular, the combustion system 16 includes a combustor nozzle having individual fuel systems for introducing, for example, natural gas or syngas fuel within the combustion system 16 and the combustion mode is selected based upon the fuel type and a fuel calorific heating value of the fuel feedstock 20. The combustor nozzle employed in the combustion system 16 will be described in detail below with reference to FIGS. 2-8.

Figure 2:
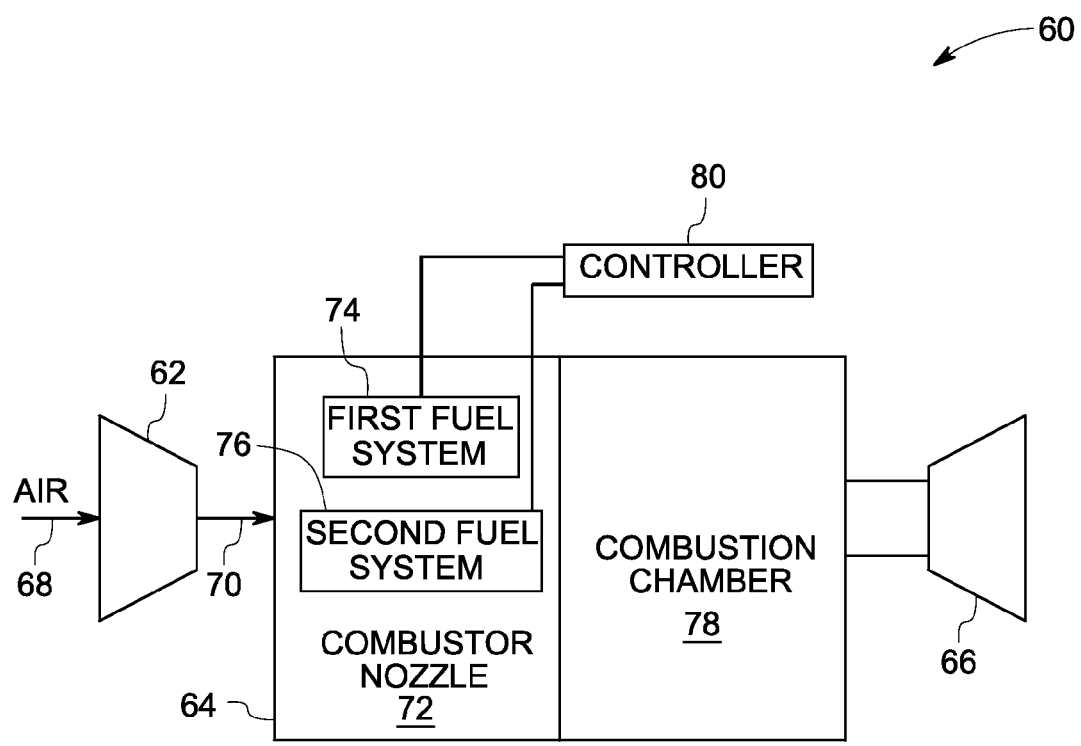
FIG. 2 is a diagrammatical illustration of the gas turbine employed in the IGCC system of FIG. 1 in accordance with aspects of the present technique.

FIG. 2 is a diagrammatical illustration of an exemplary configuration 60 of the gas turbine 14 employed in the IGCC system 10 of FIG. 1. The gas turbine 60 includes a compressor 62 and a fuel-flexible combustion system 64 in flow communication with the compressor 62. Further, the gas turbine 60 also includes a turbine 66 disposed downstream of the combustion system 64. In operation, the compressor 62 compresses an incoming flow of air 68 to generate compressed air 70 that is directed to the combustion system 64. The temperature of the air that is directed to the combustion system 64 is between about 500° F. to about 1400° F.

In this exemplary embodiment, the combustion system 64 includes a combustor nozzle 72 that is configured to introduce a fuel stream within the combustion system 64. In particular, the combustor nozzle 72 includes a first fuel system 74 and a second fuel system 76. Further, the combustion system 64 includes a combustion chamber 78 for combusting the fuel stream from the first or second fuel systems 74 and 76. In the illustrated embodiment, the first fuel system 74 is configured to introduce a syngas fuel into the combustion chamber 78 to enable lean premixed combustion within the combustion chamber. Further, the second fuel system 76 is configured to introduce the syngas fuel, a hydrocarbon fuel and diluents into the combustion chamber 78 to enable diffusion combustion within the combustion chamber. In certain embodiments, the first fuel system 74 is employed to introduce a hydrocarbon fuel into the combustion chamber 78 to enable lean premixed combustion. In certain other embodiments, the combustion system 64 may be co-fired through simultaneous operation of the first and second fuel systems 74 and 76. In this exemplary embodiment, a controller 80 is coupled to the first and second fuel systems 74 and 76 and is configured to select a combustion mode based upon at least one of a fuel type or a fuel calorific heating value of the fuel stream. The operation of the first and second fuel systems 74 and 76 employed in the combustion system 64 will be described in detail below with FIGS. 3-5.

Figure 3:
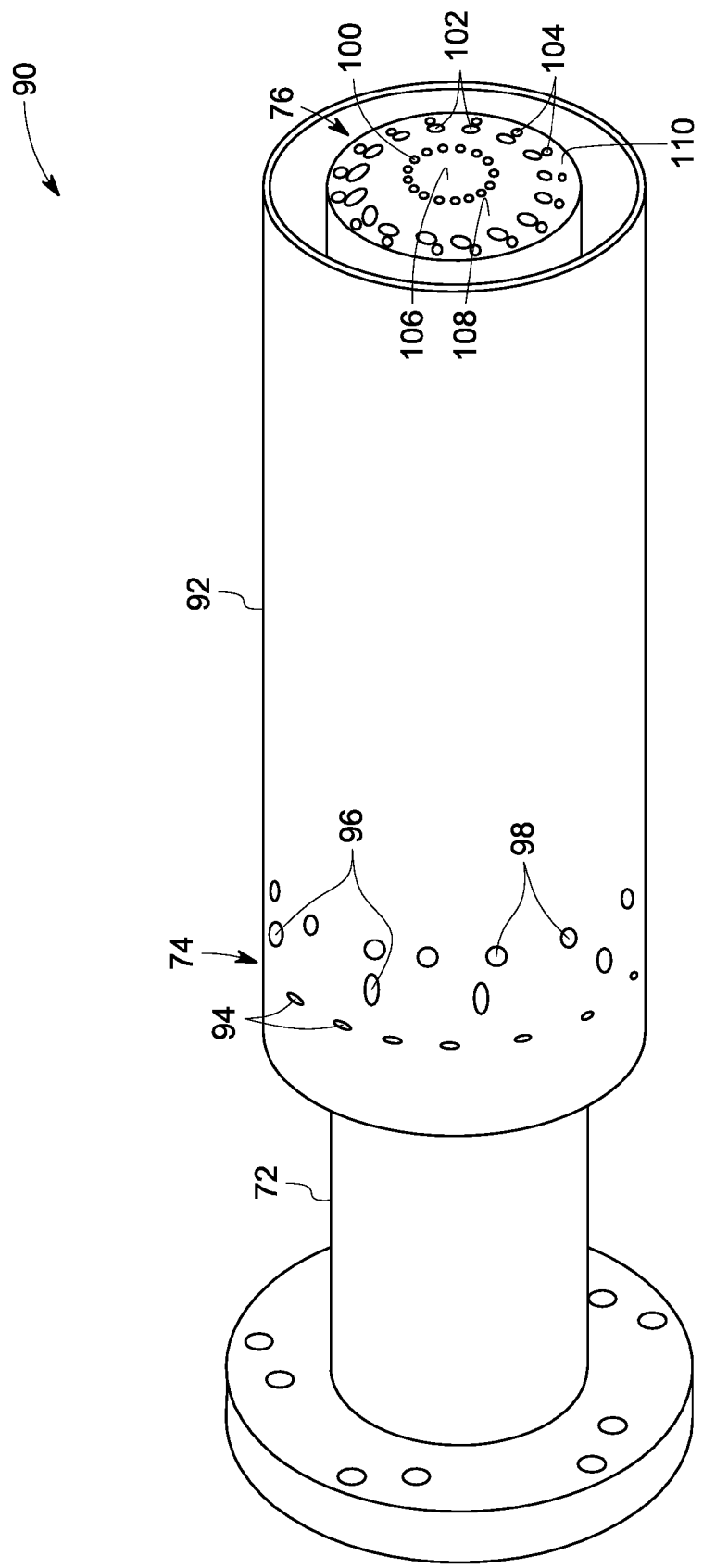
FIG. 3 is a diagrammatical illustration of an exemplary configuration of the combustor nozzle of FIG. 2 having premixed and diffusion operation capability with syngas fuel in accordance with aspects of the present technique.

FIG. 3 is a diagrammatical illustration of an exemplary configuration 90 of the combustor nozzle of FIG. 2 having premixed and diffusion operation capability with syngas fuel in accordance with aspects of the present technique. In the illustrated embodiment, a burner tube 92 is disposed about the combustor nozzle 72. The first fuel system 74 for introducing the hydrocarbon fuel or the syngas fuel for a lean premixed operation mode includes a plurality of injection orifices 94 disposed on the burner tube 92. Additionally, the first fuel system includes a plurality of injection orifices 96 disposed on a plurality of swozzle vanes (not shown) for introducing the hydrocarbon fuel or the syngas fuel within the combustor nozzle 72. In operation, the plurality of swozzle vanes are configured to provide a swirling motion to incoming air and to introduce the syngas fuel or the hydrocarbon fuel within the combustor nozzle for a premixed mode with syngas or hydrocarbon. The swozzle vanes will be described in a greater detail below with reference to FIG. 4.

In this embodiment, the combustor nozzle 90 also includes an additional set of orifices 98 disposed on the burner tube 92 for introducing the syngas fuel within the nozzle 72 for the premixed syngas mode of operation. It should be noted that the additional set of orifices 98 are provided to supply volumetric flow of syngas fuel required for the premixed syngas mode of operation. The premixing residence time of the combustor nozzle is between about 0.1 ms to about 10 ms. A plurality of patterns of the orifices 98 may be envisaged to facilitate the introduction of the syngas fuel within the nozzle 72. The pattern and shape of the orifices is selected to maximize jet penetration into each quadrant of the vane sector area thereby increasing the fuel-air homogeneity. In certain embodiments, the orifices 98 are equally spaced across the vane sector and are sized to balance the mass flow into each half of the vane sector.

In addition, the nozzle 90 includes the second fuel system 76 for introducing the syngas fuel, and/or hydrocarbon fuel and diluents within the combustion chamber 78 to enable diffusion combustion of the syngas fuel within the combustion chamber 78. In the illustrated embodiment, the second fuel system 76 includes a diffusion nozzle tip that includes injection orifices 100, 102 and 104 forming inner, outer and middle co-annular passages 106, 108 and 110 for introducing the syngas fuel, hydrocarbon fuel and diluents within the combustion chamber 78. In this embodiment, the diluents include steam, nitrogen and carbon dioxide. However, certain other inert gases may be employed as the diluents. The combustor nozzle 90 also includes a controller 80 (see FIG. 2) coupled to the first and second fuel systems 74 and 76 for selecting a combustion mode based upon a fuel type, or a fuel calorific heating value of the fuel stream. Further, the controller is configured to control the flow through the injection orifices 100, 102 and 104 of the second fuel system 76 based upon a required volumetric flow of the syngas fuel.

Figure 4:
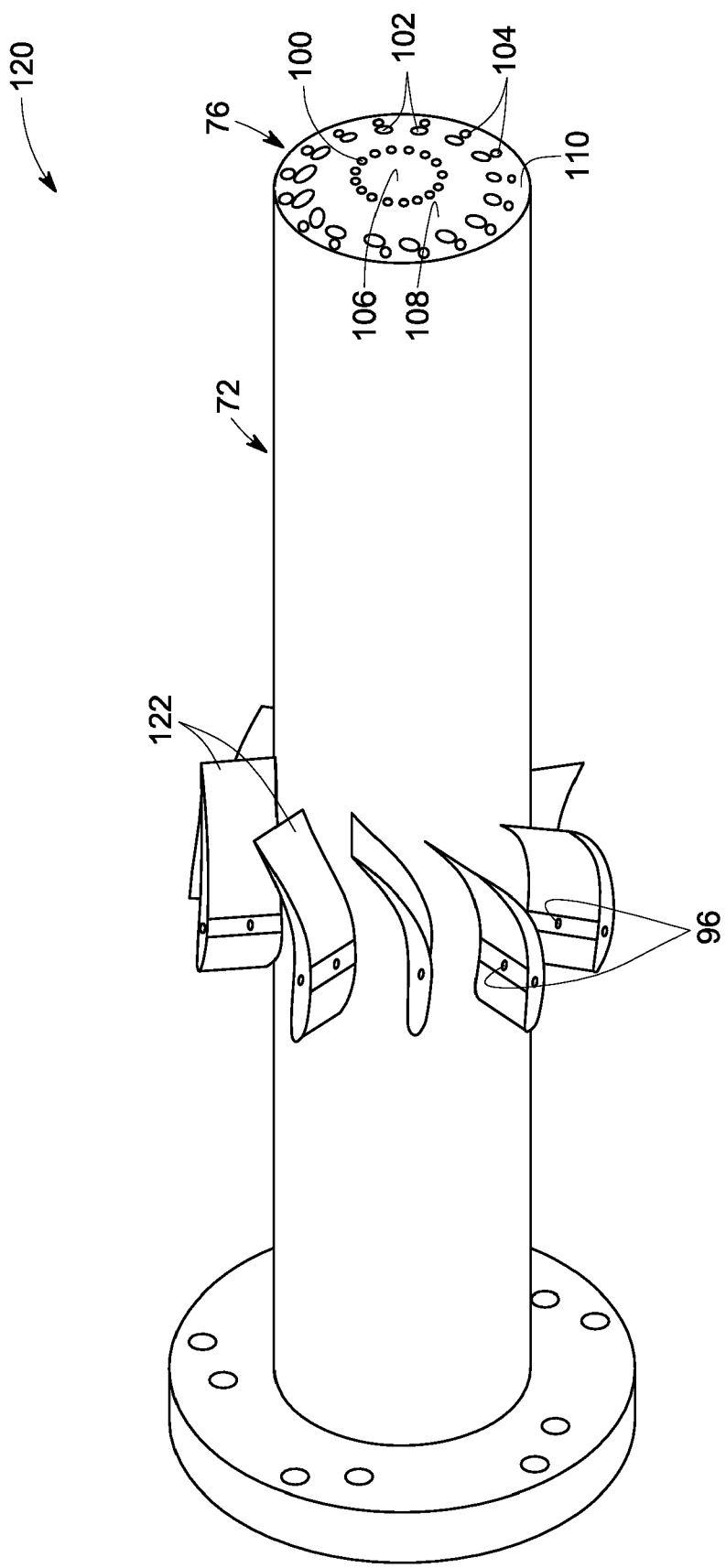
FIG. 4 is a diagrammatical illustration of an exemplary configuration of the combustor nozzle of FIG. 3 having swozzle fuel injection points in accordance with aspects of the present technique.

FIG. 4 is a diagrammatical illustration of an exemplary configuration 120 of the combustor nozzle 90 of FIG. 3 having swozzle fuel injection points in accordance with aspects of the present technique. The combustor nozzle 120 includes swozzle vanes 122 that are configured to provide a swirling motion to the incoming air. Further, the swozzle vanes 122 are configured to introduce the hydrocarbon fuel and the syngas fuel into the nozzle 120 through the swozzle fuel injection points 124. Typically, the swozzle vanes 122 are designed to maximize the fuel-air mixing to meet performance requirements such as flame holding and low emissions. In the illustrated embodiment, the hydrocarbon fuel includes natural gas. In operation, natural gas, or the syngas fuel introduced through the swozzle vanes 122 is mixed with air in a location upstream of the combustion chamber 78 (see FIG. 2) to generate a premixed flame at lean conditions that are conducive for low emissions.

In certain embodiments, the injection of the hydrocarbon fuel or the syngas fuel through the plurality of injection orifices 96 takes place at one location per side of each swozzle vane 122. Further, the injection of the hydrocarbon fuel or the syngas fuel through the plurality of injection orifices 96 takes place at one or more injection points per swirler vane. The injection points may be located on one or both sides of the vane at different radial positions, and may have different diameters. In this exemplary embodiment, the injections points are located on the sides of the vanes. In certain other embodiments, the injection points may be located at the trailing edge. Advantageously, such injection of fuel through the injection orifices 94 and 96 enhances fuel jet penetration into each quadrant of each vane sector, thereby facilitating the mixing within the combustor nozzle 120. It should be noted that the injection points 96 on the swozzle vanes 122 and the injection points 94 and 98 on the burner tube 92 are coupled to individual fuel feed systems, thereby facilitating control of combustion dynamics in the system.

As will be appreciated by one skilled in the art the combustion system 64 is fired in a premixed configuration with natural gas when the coal gasified syngas fuel supply is interrupted or is required for alternative power plant uses. Alternatively, the combustion system 64 is fired in a premixed or a diffusion mode with syngas fuel, where the fuel is introduced within the nozzle 120 through the first or second fuel systems 74 or 76. In certain embodiments, the combustion system may be started with natural gas in the second fuel system 76.

In this exemplary embodiment, the diffusion nozzle tip is designed to maximize the performance based upon the design of the swozzle vanes 122. In particular, the tip geometry of the nozzle 120 may be optimized for the airflow pattern generated by the swozzle vanes 122. Moreover, the injection orifices 100, 102 and 104 are designed to handle a wide range of syngas fuels and accompanying diluents for low emission performance. It should be noted that the flow of syngas fuel, hydrocarbon fuel and diluents through the injection orifices 100, 102 and 104 may be controlled based upon a desired volumetric flow rate of the syngas fuel. For example, in the illustrated embodiment, the first passage 106 is configured to introduce the steam into the combustion chamber 78 of the combustor. Further, the second passage 108 disposed around the first passage 106 is configured to introduce the syngas fuel and the third passage 10 disposed about the first and second passages 106 and 108 is configured to introduce nitrogen within the combustion chamber of the combustion system. As will be appreciated by one skilled in the art, a plurality of operational modes for the first second and third passages 106, 108 and 110 may be envisaged based upon the fuel calorific value of the syngas fuel.

The first, second and third passages 106, 108 and 110 are designed so that the combustor nozzle 120 may be employed with either oxygen-enhanced or with traditional gasification units. As will be appreciated by one skilled in the art in the traditional gasification units, steam from the gasification units may be utilized as a diluent to facilitate combustion. However, in the oxygen enhanced gasification units nitrogen from an air separation unit may be employed as an additional diluent for enhancing the overall plant efficiency.

In a present embodiment, the first, second and third passages 106, 108 and 110 are designed based upon a desired range of calorific heating values of the fuel produced from the coal gasification units. In this embodiment, the fuel calorific value of the syngas fuel is less than about 310 BTU/scf. In one embodiment, the fuel calorific value of the syngas fuel is about between 100 BTU/scf to about 230 BTU/scf. For example, the passage for flowing syngas fuel may be designed to account for introducing low heating value fuel that requires a large volumetric flow rate. Similarly, the passage for flowing diluents may be designed according to higher heating value fuel that require relatively greater diluent flow to meet desired performance levels.

In an exemplary embodiment, the first, second and third passages 106, 108 and 10 have a tangential injection angle of about 0 degrees to about 75 degrees and a radial injection angle of about 0 degrees to about 75 degrees. In one embodiment, the second and third passages 108 and 110 have a tangential injection angle of about 40 degrees and the first and second passages 108 and 110 have a radial injection angle of about 45 degrees. Further, in one embodiment, the flow of syngas fuel and nitrogen in the second and third passages 108 and 110 is counter swirled with respect to the air swirl generated by the vanes 122 to facilitate enhanced mixing, decreased flame length, reduced emissions and increased flame front pattern factors. Moreover, as described above, the controller 80 (see FIG. 2) may be coupled to the first, second and third passages 106, 108, 110 to control the flow of syngas fuel, hydrocarbon fuel, steam and nitrogen and CO2 within the passages 106, 108 and 110 based upon the fuel calorific heating value of the syngas fuel. As described above, individual fuel plenums may be coupled to the first and second fuel systems 74 and 76 to supply the syngas or the hydrocarbon fuel during premixed and diffusion modes of operation.

Figure 5:
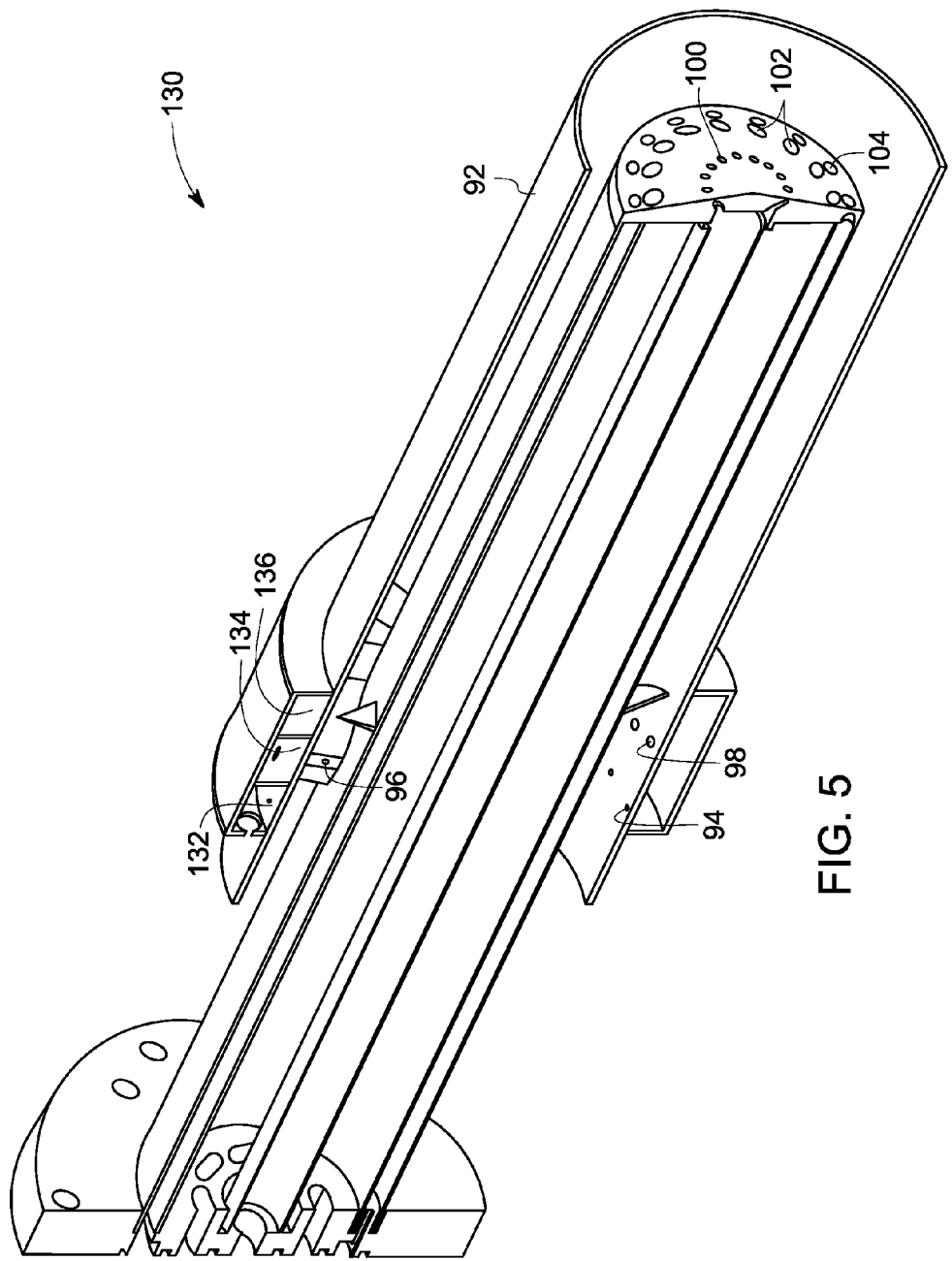
FIG. 5 is a sectional view of the exemplary configuration of the combustor nozzle of FIG. 4 having individual fuel plenums for supplying fuel to the swozzle fuel injection points in accordance with aspects of the present technique.

FIG. 5 is a sectional view 130 of the exemplary configuration of the combustor nozzle 120 of FIG. 4 having individual fuel plenums for supplying fuel to the swozzle fuel injection points and burner tube fuel injection points in accordance with aspects of the present technique. As described before, the combustor nozzle 130 includes first set of orifices 94 disposed on the burner tube 92 for introducing the syngas or hydrocarbon fuel within the nozzle 130. Further, the combustor nozzle 130 includes second set of orifices 96 disposed on the swozzle vanes 122 (see FIG. 4) for introducing the syngas or hydrocarbon fuel within the nozzle 130. Additionally, the combustor nozzle 130 includes third set of orifices 98 disposed on the burner tube 92 for introducing the syngas fuel within the nozzle 130 to account for additional volumetric flow of the syngas fuel required for the premixed mode of operation.

In the illustrated embodiment, the combustor nozzle 130 includes a first fuel plenum 132 configured to supply the hydrocarbon or syngas fuel to the first set of orifices 94 disposed on the burner tube 92 and a second fuel plenum 134 configured to supply the hydrocarbon or syngas fuel to the second set of orifices 96 disposed on the swozzle vanes 122. In addition, the combustor nozzle 130 includes a third fuel plenum 136 configured to supply the hydrocarbon or syngas fuel to the third set of orifices 98 disposed on the burner tube 72. The first, second and third fuel plenums 132, 134 and 136 may be coupled to the controller 80 (see FIG. 2) for controlling the supply of the fuel within the combustor nozzle 130. In this exemplary embodiment, the premixed mode of operation with the hydrocarbon fuel employs the first and second set of orifices 94 and 96 for introducing the hydrocarbon fuel within the nozzle 130. Further, for the premixed mode of operation with syngas fuel the third set of orifices 98 are utilized for introducing the syngas fuel within the nozzle 130.

In certain embodiments, the combustor nozzle 130 is operated as a stand-alone configuration for the premixed mode of operation. In this exemplary embodiment, the syngas mode of operation is controlled based upon the heating value of the fuel. For example, the first and second sets of orifices 94 and 96 will be in use at all times whereas the third set of orifices 98 will be employed based upon the heating value of the fuel. As described above, the combustor nozzle 130 may be operated with the premixed hydrocarbon and syngas modes of operation along with the diffusion mode of operation with syngas. Alternately, the combustor nozzle 130 may be operated without the diffusion mode of operation with syngas as described below with reference to FIG. 6.

Figure 6:
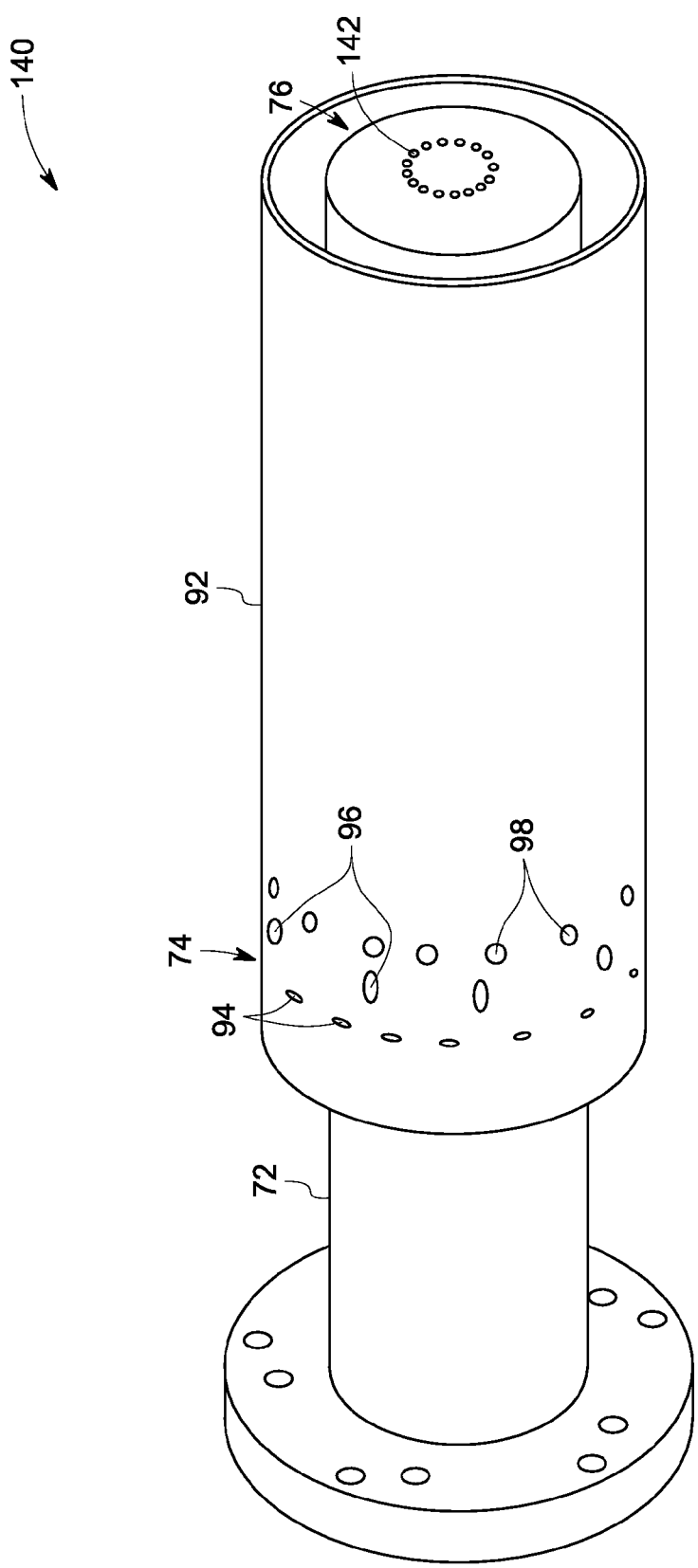
FIG. 6 is a diagrammatical illustration of another exemplary configuration of the combustor nozzle of FIG. 2 having premixed operation capability with hydrocarbon and syngas fuel in accordance with aspects of the present technique.

FIG. 6 is a diagrammatical illustration of another exemplary configuration 140 of the combustor nozzle 72 of FIG. 2 having premixed operation capability with hydrocarbon and syngas fuel in accordance with aspects of the present technique. As illustrated, the combustor nozzle 140 includes the first, second and third sets of orifices 94, 96 and 98 for introducing the hydrocarbon or syngas fuels within the combustor nozzle 140 for premixed mode of operation. In addition, the nozzle tip includes a set of orifices 142 for introducing the hydrocarbon fuel for a diffusion mode during a light off condition.

Figure 7:
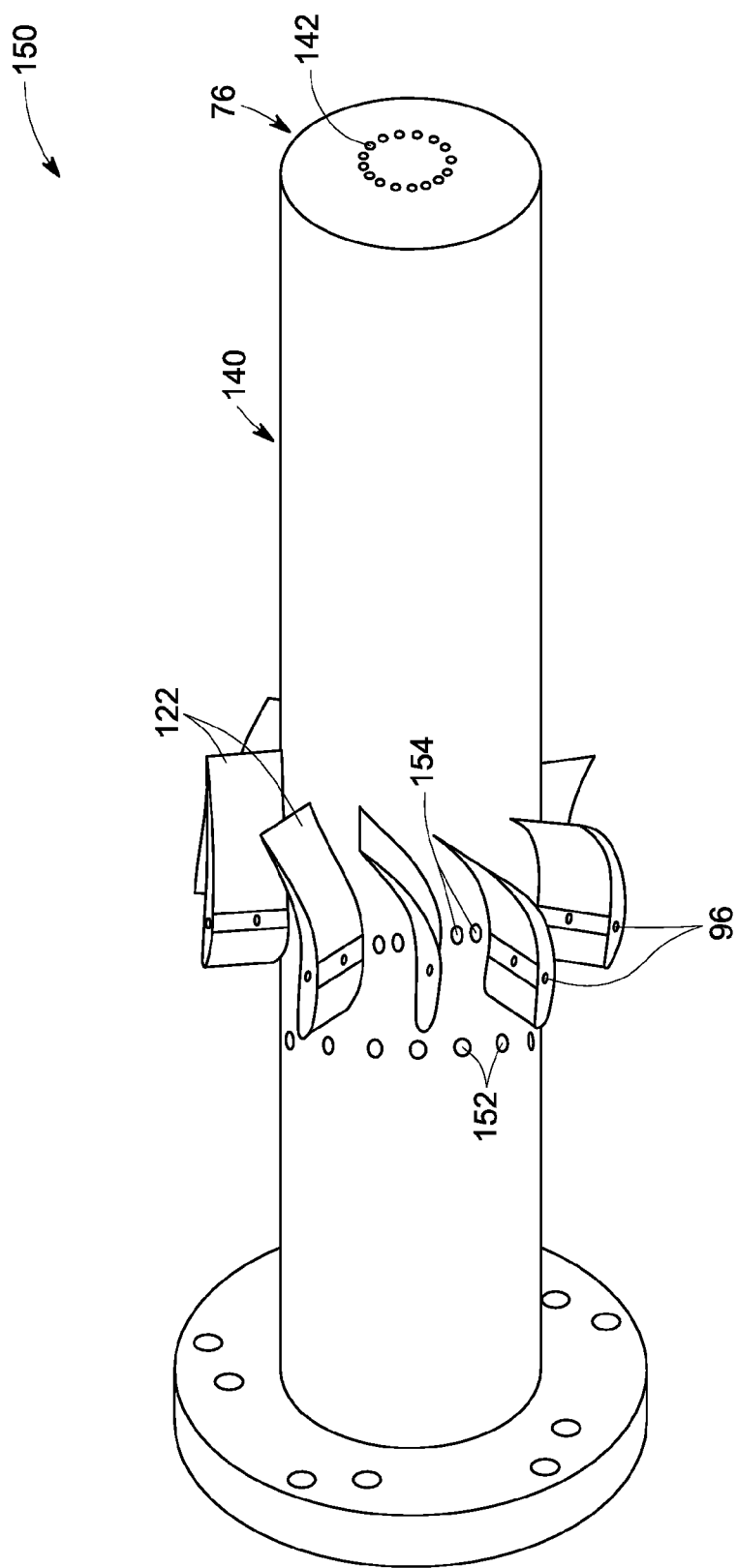
FIG. 7 is a diagrammatical illustration of an exemplary configuration of the combustor nozzle of FIG. 6 having swozzle and centerbody fuel injection points in accordance with aspects of the present technique.

FIG. 7 is a diagrammatical illustration of an exemplary configuration 150 of the combustor nozzle 140 of FIG. 6 having swozzle and centerbody fuel injection points in accordance with aspects of the present technique. In this exemplary embodiment, the combustor nozzle 150 includes the swozzle injection points 96. In addition, the nozzle 150 includes a first set of orifices 152 disposed on the centerbody for introducing the hydrocarbon or syngas fuel within the nozzle 150 for premixed mode of operation. In addition, the nozzle includes a second set of orifices 154 for introducing the syngas fuel to account for any additional volumetric flow required during premixed syngas mode of operation. Again, the first and second set of orifices 152 and 154 may be coupled to individual fuel plenums as will be described below with reference to FIG. 8. Beneficially, this mode of operation provides greater flexibility of operation since more or less injection points may be used for fuel injection depending upon the heating value of the fuel. Further, the numerous number of injection points allows for greater fuel flexibility of the combustor by accounting for large variations in flow rates that occur over the range of syngas fuels.

Figure 8:
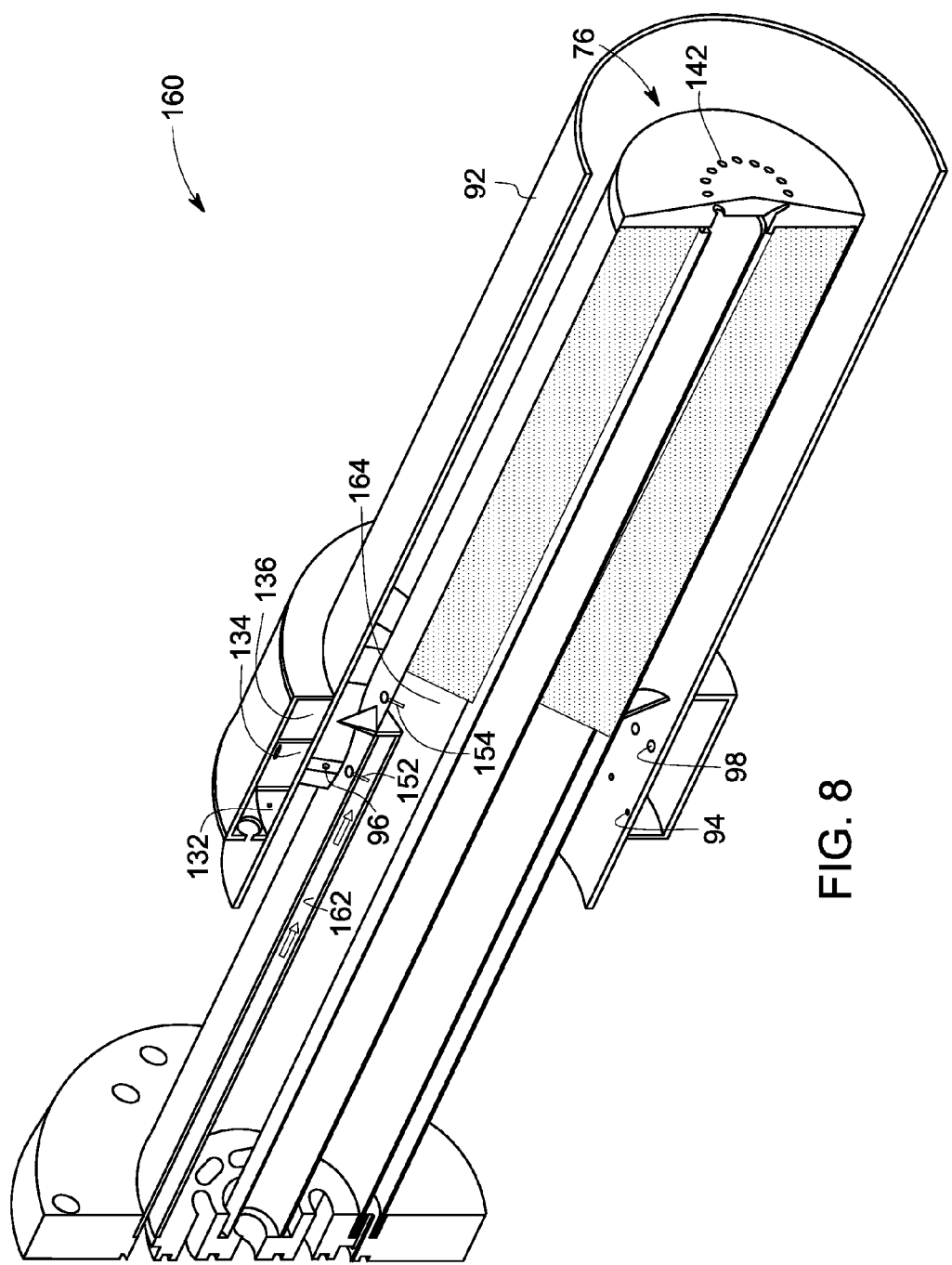
FIG. 8 is a sectional view of the exemplary configuration of the combustor nozzle of FIG. 7 having individual fuel plenums for supplying fuel to the swozzle and centerbody fuel injection points in accordance with aspects of the present technique.

FIG. 8 is a sectional view 160 of the exemplary configuration of the combustor nozzle 150 of FIG. 7 having individual fuel plenums for supplying fuel to the swozzle and centerbody fuel injection points in accordance with aspects of the present technique. As illustrated, the combustor nozzle 160 includes the first, second and third sets of orifices 94, 96 and 98 for introducing the hydrocarbon or the syngas fuel within the nozzle 160 during a premixed mode of operation. In addition, the nozzle 160 includes the orifices 152 and 154 disposed on the centerbody for introducing the hydrocarbon or syngas fuel within the nozzle 150 for premixed mode of operation. As described before, the first, second and third sets of orifices are coupled to the fuel plenums 132, 134 and 136 for supplying the fuel. In this exemplary embodiment, the nozzle 160 also includes fuel plenums 162 and 164 configured to supply the hydrocarbon or syngas fuel to the orifices 152 and 154 respectively. Again, each of the fuel plenums 162 and 164 may be coupled to the controller 80 (see FIG. 2) for controlling the supply of the fuel to the orifices 152 and 154.

The various aspects of the method described hereinabove have utility in different applications such as combustion systems employed in IGCC systems. As noted above, the fuel-flexible combustion system works with a variety of fuels while having reduced emissions. Further, the combustion system has sustained low emission firing with a backup fuel and is adaptable to different power plant configurations while maintaining the overall power plant efficiency. In particular, the present technique employs a combustor nozzle that operates with natural gas and a wide range of syngas fuels by switching between lean premixed and diffusion combustion modes based upon a desired volumetric flow rate of the fuel feedstock.

Advantageously, the premixed combustion mode facilitates the operation of the combustion system without requiring diluents for meeting the emission requirements thereby reducing the fuel consumption of the combustion system. Further, the premixed combustion mode allows the byproducts of an air separation unit for oxygen enhanced gasifiers and steam from steam turbine to be utilized more efficiently in other plant processes such as chemical production, after-treatment, combined cycle power generation and so forth. Thus, the combustion system has significantly enhanced fuel flexibility while maintaining reduced emissions and may be operated with different power plant configurations while maintaining the overall power plant efficiency.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A combustor nozzle, comprising:
a first fuel system configured to introduce at least one of a syngas fuel, a hydrocarbon fuel into a combustion chamber to enable lean premixed combustion within the combustion chamber, wherein the first fuel system comprises:
a first set of injection orifices disposed on at least one of a burner tube or a burner center body for introducing at least one of the hydrocarbon fuel or the syngas fuel within the nozzle, for a premixed hydrocarbon or syngas mode of operation;
a second set of injection orifices disposed on a plurality of swozzle vanes for introducing at least one of the hydrocarbon fuel or the syngas fuel within the nozzle, for the premixed hydrocarbon or syngas mode of operation; and
a third set of injection orifices disposed on the burner tube for introducing the syngas fuel within the nozzle for the premixed syngas mode of operation; and
a second fuel system configured to introduce at least one of the syngas fuel, the hydrocarbon fuel, or diluents into the combustion chamber to enable diffusion combustion within the combustion chamber, wherein the second fuel system comprises:
a diffusion nozzle tip that includes a plurality of injection orifices circumferentially distributed in the nozzle tip.

2. The combustor nozzle of claim 1, further comprising a controller coupled to the first and second fuel systems, wherein the controller is configured to select a combustion mode based upon at least one of a fuel type or a fuel calorific heating value of a fuel stream.

3. The combustor nozzle of claim 1, wherein the plurality of swozzle vanes are configured to provide a swirling motion to incoming air and to introduce the syngas fuel and the hydrocarbon fuel through the second set of injection orifices disposed on each of the swozzle vanes.

4. The combustor nozzle of claim 1, further comprising respective fuel plenums for supplying at least one of the hydrocarbon fuel, or the syngas fuel to the first, second and third sets of injection orifices.

5. The combustor nozzle of claim 1, wherein a pattern and shape of the first, second and third sets of injection orifices are selected to substantially maximize fuel jet penetration into each respective zone of vane sector area.

6. The combustor nozzle of claim 2, wherein the second fuel system comprises an inner, a middle and an outer co-annular passages and orifices configured to introduce the syngas fuel, hydrocarbon fuel and diluents within the combustion chamber.

7. The combustor nozzle of claim 6, wherein the controller is configured to control the flow of the syngas fuel, hydrocarbon fuel and the diluents in each of the inner, middle and outer passages based upon the fuel calorific heating value of the fuel stream.

8. The combustor nozzle of claim 6, wherein the inner, middle and outer passages are designed based upon a desired range of fuel calorific heating value of the syngas fuel.

9. The combustor nozzle of claim 6, wherein the flow of syngas fuel and diluents in the second and third passages is counter swirled with respect to air swirl to facilitate enhanced mixing.

10. The combustor nozzle of claim 6, wherein the inner, middle and outer passages have a tangential injection angle of about 0 degrees to about 75 degrees and a radial injection angle of about 0 degrees to about 75 degrees.

11. A fuel-flexible combustion system, comprising:
a combustion chamber configured to combust a fuel stream and air through a combustion mode selected based upon a fuel type of the fuel stream; and
a combustor nozzle configured to introduce the fuel stream within the combustion system, wherein the combustor nozzle comprises:
a first fuel system configured to introduce at least one of a syngas fuel or a hydrocarbon fuel into the combustion chamber to enable a lean premixed combustion within the combustion chamber, wherein the first fuel system comprises:
a first set of injection orifices disposed on at least one of a burner tube or a burner center body for introducing at least one of the hydrocarbon fuel or the syngas fuel within the nozzle, for a premixed hydrocarbon or syngas mode of operation;
a second set of injection orifices disposed on a plurality of swozzle vanes for introducing at least one of the hydrocarbon fuel or the syngas fuel within the nozzle, for the premixed hydrocarbon or syngas mode of operation, and
a third set of injection orifices disposed on the burner tube for introducing the syngas fuel within the nozzle for the premixed syngas mode of operation; and
a second fuel system configured to introduce at least one of the syngas fuel, nitrogen, steam, carbon dioxide, the hydrocarbon fuel into the combustion chamber to enable a diffusion combustion mode within the combustion chamber, wherein the second fuel system comprises:
a diffusion nozzle tip that includes a plurality of injection orifices circumferentially distributed in the nozzle tip.

12. The fuel-flexible combustion system of claim 11, further comprising a controller coupled to the first and second fuel systems, wherein the controller is configured to select a combustion mode based upon at least one of a fuel type or a fuel calorific heating value of a fuel stream.

13. The fuel-flexible combustion system of claim 11, wherein the plurality of swozzle vanes are configured to provide a swirling motion to incoming air and to introduce the syngas fuel and the hydrocarbon fuel through the second set of orifices disposed on each of the swozzle vanes.

14. The fuel-flexible combustion system of claim 11, further comprising respective fuel plenums for supplying the hydrocarbon and the syngas fuels to the first, second and third sets of injection orifices.

15. The fuel-flexible combustion system of claim 12, wherein the second fuel system comprises an inner, a middle and an outer co-annular passages and orifices configured to introduce the syngas fuel, hydrocarbon fuel and diluents within the combustion chamber.

16. The fuel-flexible combustion system of claim 15, wherein the controller is configured to control the flow of the syngas fuel, hydrocarbon fuel and the diluents in each of the inner, middle and outer passages based upon the fuel calorific heating value of the fuel stream.

17. The fuel-flexible combustion system of claim 11, wherein a temperature of the air is between about 500° F. to about 1400° F.

18. The fuel-flexible combustion system of claim 11, wherein a premixing residence time of the combustor nozzle is between about 0.1 ms to about 10 ms.

19. An integrated coal gasification combined cycle (IGCC) system, comprising:

a gasifier configured to produce a syngas fuel from coal; and a gas turbine configured to receive the syngas fuel from the gasifier and to combust the syngas fuel and air within a combustion system to produce electrical energy, wherein the combustion system comprises:

a combustion chamber configured to combust the syngas fuel and air through premixed or diffusion modes of combustion; and a combustion nozzle comprising:

a first fuel system configured to introduce at least one of a syngas fuel, a hydrocarbon fuel into the combustion chamber to a enable lean premixed combustion within the combustion chamber, wherein the first fuel system comprises:

a first set of injection orifices disposed on at least one of a burner tube or a burner center body for introducing at least one of the hydrocarbon fuel or the syngas fuel within the nozzle, for a premixed hydrocarbon or syngas mode of operation;

a second set of injection orifices disposed on a plurality of swozzle vanes for introducing at least one of the hydrocarbon fuel or the syngas fuel within the nozzle, for the premixed hydrocarbon or syngas mode of operation, and a third set of injection orifices disposed on the burner tube for introducing the syngas fuel within the nozzle for the premixed syngas mode of operation; and a second fuel system configured to introduce at least one the syngas fuel or the hydrocarbon fuel or diluents into the combustion chamber to enable diffusion combustion within the combustion chamber, wherein the second fuel system comprises:

a diffusion nozzle tip that includes a plurality of injection orifices circumferentially distributed in the nozzle tip.

20. The IGCC system of claim 19, wherein the plurality of swozzle vanes are configured to provide a swirling motion to air and to introduce the syngas fuel into the combustion system for lean premixed combustion.

21. The IGCC system of claim 19, wherein the second fuel system comprises an inner, a middle and an outer co-annular passages and orifices configured to introduce at least one of the syngas fuel, hydrocarbon fuel, diluents within the combustion chamber.

22. The IGCC system of claim 21, wherein the diluents comprise at least one of steam, nitrogen, or carbon dioxide.

* * * * *

UNITED STATES PATENT AND TRADEMARK OFFICE
CERTIFICATE OF CORRECTION

| | | |
|---|---|---|
| PATENT NO. | : 7,908,864 B2 | |
| APPLICATION NO. | : 11/539195 | |
| DATED | : March 22, 2011 | |
| INVENTOR(S) | : Haynes et al. | |

It is certified that error appears in the above-identified patent and that said Letters Patent is hereby corrected as shown below:

In Column 6, Line 27, delete "10" and insert -- 110 --, therefor.

In Column 6, Line 57, delete "10" and insert -- 110 --, therefor.

In Column 11, Line 13, in Claim 19, delete "to a enable" and insert -- to enable a --, therefor.

In Column 12, Lines 4-5, in Claim 19, delete "one the" and insert -- one of the --, therefor.

Signed and Sealed this
Twenty-eighth Day of June, 2011

David J. Kappos
*Director of the United States Patent and Trademark Office*